(12) United States Patent
Kim et al.

(10) Patent No.: US 9,574,047 B2
(45) Date of Patent: Feb. 21, 2017

(54) HEAT-SHRINKABLE POLYESTER FILM

(75) Inventors: Seong Do Kim, Suwon-si (KR); Taebyoung Oh, Suwon-si (KR)

(73) Assignee: SKC CO., LTD, Suwon-Si (KR)

( * ) Notice: Subject to any disclaimer, the term of this patent is extended or adjusted under 35 U.S.C. 154(b) by 667 days.

(21) Appl. No.: 13/880,563

(22) PCT Filed: Oct. 19, 2011

(86) PCT No.: PCT/KR2011/007786
§ 371 (c)(1),
(2), (4) Date: Jun. 28, 2013

(87) PCT Pub. No.: WO2012/053821
PCT Pub. Date: Apr. 26, 2012

(65) Prior Publication Data
US 2013/0274434 A1 Oct. 17, 2013

(30) Foreign Application Priority Data
Oct. 20, 2010 (KR) .................. 10-2010-0102544

(51) Int. Cl.
| | | |
|---|---|---|
| C08G 63/183 | (2006.01) | |
| C08G 63/199 | (2006.01) | |
| C08L 67/03 | (2006.01) | |
| C08L 67/02 | (2006.01) | |
| B32B 27/36 | (2006.01) | |
| C08J 5/18 | (2006.01) | |
| B65C 3/06 | (2006.01) | |
| B65C 3/08 | (2006.01) | |

(52) U.S. Cl.
CPC .......... *C08G 63/183* (2013.01); *C08G 63/199* (2013.01); *C08J 5/18* (2013.01); *C08L 67/02* (2013.01); *C08L 67/03* (2013.01); *B32B 27/36* (2013.01); *B32B 2307/736* (2013.01); *B32B 2367/00* (2013.01); *B32B 2519/00* (2013.01); *B65C 3/065* (2013.01); *B65C 3/08* (2013.01); *C08J 2367/02* (2013.01); *Y10T 428/1328* (2015.01); *Y10T 428/1331* (2015.01); *Y10T 428/31786* (2015.04); *Y10T 428/31797* (2015.04)

(58) Field of Classification Search
None
See application file for complete search history.

(56) References Cited

U.S. PATENT DOCUMENTS

| | | | | |
|---|---|---|---|---|
| 5,407,752 | A | * | 4/1995 | Fukuzumi et al. ........... 428/480 |
| 2006/0141182 | A1 | * | 6/2006 | Giblin ......................... 428/34.9 |
| 2007/0071967 | A1 | * | 3/2007 | Inagaki ................. B29C 61/003 |
| | | | | 428/341 |
| 2007/0248777 | A1 | | 10/2007 | Lee et al. |
| 2008/0057236 | A1 | * | 3/2008 | Yamada .................. B32B 27/36 |
| | | | | 428/34.9 |
| 2009/0038737 | A1 | * | 2/2009 | Previty et al. .................. 156/86 |
| 2009/0074998 | A1 | * | 3/2009 | Hiruma ................. B29C 61/003 |
| | | | | 428/34.9 |
| 2010/0189998 | A1 | | 7/2010 | MacKerron et al. |
| 2011/0172386 | A1 | * | 7/2011 | Kim et al. ................. 528/308.6 |
| 2011/0230635 | A1 | * | 9/2011 | Lee et al. ...................... 528/307 |

FOREIGN PATENT DOCUMENTS

| | | | |
|---|---|---|---|
| EP | 0 409 288 A2 | | 1/1991 |
| JP | 63-202429 A | | 8/1988 |
| JP | 02-153941 | * | 6/1990 |
| JP | 03-045631 | * | 2/1991 |
| JP | 07-188400 | * | 7/1995 |
| JP | 07-188400 A | | 7/1995 |
| JP | 2000-153884 A | | 6/2000 |
| JP | 2002212405 A | | 7/2002 |
| JP | 2004-250040 A | | 9/2004 |
| JP | 2005-112371 A | | 4/2005 |
| KR | 10-0591070 B1 | | 6/2006 |
| KR | 10-0593971 B1 | | 6/2006 |
| KR | 10-0874131 B1 | | 12/2008 |
| KR | 10-2010-0060848 A | | 6/2010 |
| KR | 10-0981129 B1 | | 9/2010 |

OTHER PUBLICATIONS

Japanese Patent Office, Communication dated Apr. 21, 2015, issued in corresponding Japanese Patent Application No. 2013-533781.
Japanese Patent Office, Communication dated Jun. 24, 2014, issued in corresponding Japanese Patent Application No. 2013-533781.
Korean Patent Office, Office Action issued in corresponding KR Application No. 10-2010-0102544, dated May 9, 2012.
International Searching Authority International Search Report for PCT/KR2011/007786 dated May 4, 2012.

* cited by examiner

*Primary Examiner* — Vivian Chen
(74) *Attorney, Agent, or Firm* — Sughrue Mion, PLLC

(57) ABSTRACT

Disclosed is a heat-shrinkable polyester film having a heat shrinkage initiation temperature of 60° C. or lower, a glass transition temperature (Tg) of 77° C. or lower and a heat shrinkage rate of 2% or more at 60° C. which has relatively low glass transition temperature and heat shrinkage initiation temperature, and thus can be useful as a label for a high-density polyethylene (HDPE) container and the like.

8 Claims, No Drawings

HEAT-SHRINKABLE POLYESTER FILM

FIELD OF THE INVENTION

The present invention relates to a heat-shrinkable polyester film which is useful as an outer packaging material and the like, and, more particularly, to a heat-shrinkable polyester film which is useful as a label for a high-density polyethylene (HDPE) container.

BACKGROUND OF THE INVENTION

Various types of labels are currently used to display names and information about contents on a glass bottle, a plastic bottle, and the like. Conventionally, paper labels, each of which is attached to an object by an adhesive, have been used. Recently, however, full wrapping labels are used in order to print a variety of contents or display a lot of information. For this reason, heat-shrinkable films have attracted considerable attention.

A heat-shrinkable film is referred to as a film which is contracted to an original state at a predetermined temperature or more after being stretched and oriented, and is used in packaging various shapes of containers.

A high-density polyethylene (HDPE) container is generally used for household supplies (e.g., shampoo, lotion, etc.), and is characterized in that it has a higher thermal expansion coefficient than those of other materials, and it starts to expand at 50° C. Owing to such characteristics of HDPE, when a conventional heat-shrinkable polyester film that starts to expand at 70° C. is used, the HDPE container starts to expand before the heat-shrinkable polyester film is contracted. As a result, this heat-shrinkable polyester film is labeled on the expanded HDPE container. However, when the temperature of the HDPE container labeled with the heat-shrinkable polyester film drops down to room temperature, the HDPE container contracts back to its original size, the film becomes loose, resulting in lose adhesivity of the heat-shrinkable polyester film to the HDPE container.

Therefore, it is required to develop a novel heat-shrinkable polyester film having excellent adhesivity when applied to a HDPE container.

SUMMARY OF THE INVENTION

It is an object of the present invention to provide a heat-shrinkable polyester film which is suitable for use as a label for a high-density polyethylene (HDPE) container.

In accordance with one aspect of the present invention, there is provided a heat-shrinkable polyester film having a heat shrinkage initiation temperature of 60° C. or lower, a glass transition temperature (Tg) of 77° C. or lower and a heat shrinkage rate of 2% or more at 60° C.

The heat-shrinkable polyester film may have a heat shrinkage rate of 15% or more at 65° C., a heat shrinkage rate of 42% or more at 70° C. and a heat shrinkage rate of 70% or more at 80° C.

The heat-shrinkable polyester film may be prepared by the random copolymerization of one kind of dibasic acid component with three kinds of diol components.

In accordance with another aspect of the present invention, there is provided a label for container comprising the heat-shrinkable polyester film.

The heat-shrinkable polyester film of the present invention has a heat shrinkage initiation temperature of 60° C. or lower owing to its low glass transition temperature (Tg) as compared to conventional films, and thus can be useful as a label for a HDPE container and the like.

DETAILED DESCRIPTION OF THE INVENTION

Hereinafter, the present invention will be described in more detail.

The heat-shrinkable polyester film may be prepared by random copolymerization of one kind of dibasic acid component with three kinds of diol components.

In a preferred embodiment of the present invention, the heat-shrinkable polyester film may be prepared by random-copolymerization of (A1) one of terephthalic acid and dimethyl terephthalate as the dibasic acid component with (B1) ethylene glycol, (B2) one of neopentyl glycol and cyclohexanedimethanol and (B3) a linear diol component having three or more carbon atoms at a main chain thereof as the diol components.

In the diol components, the component (B3) may be selected from the group consisting of diethylene glycol, 1,3-propanediol, 1,4-butanediol and 1,5-pentanediol.

Further, in the diol components (B1) to (B3), preferably, the amount of the component (B1) may be 60 to 90 mol %, the amount of the component (B2) may be 5 to 30 mol % and the amount of the component (B3) may be 1 to 20 mol %. More preferably, the amount of the component (B1) may be 60 to 85 mol %, the amount of the component (B2) may be 10 to 25 mol % and the amount of the component (B3) may be 1 to 15 mol %.

As a result, a polymer constituting the heat-shrinkable polyester film may be a random copolymer having the following repetitive units:

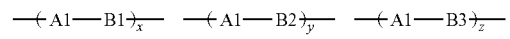

wherein each of x, y and z is the number of repetitive units.

The heat-shrinkable polyester film of the present invention having the above composition ratio may have a heat shrinkage initiation temperature of 60° C. or lower, and preferably, 55° C. to 60° C. because the glass transition temperature (Tg) of the heat-shrinkable polyester film is lower than that (about 78° C. to 80° C.) of a conventional polyester film. The heat-shrinkable polyester film of the present invention may have a glass transition temperature of 77° C. or lower, preferably 70° C. to 77° C., and more preferably 70° C. to 75° C.

As a result, the heat-shrinkable polyester film of the present invention exhibits a heat shrinkage rate different from that of a conventional polyester film. Specifically, when this heat-shrinkable polyester film was heat-treated in a water tank for 10 seconds, it is preferred that the heat shrinkage rate of the heat-shrinkable polyester film in the main contraction direction is 2% or more at 60° C., 15% or more at 65° C., 42% or more at 70° C., and 70% or more at 80° C. More preferably, the heat shrinkage rate thereof may be 2% to 10% at 60° C., 15% to 40% at 65° C., 42% to 60% at 70° C., and 70% to 75% at 80° C.

The heat-shrinkable polyester film of the present invention may be prepared by a method comprising the steps of: (a) mixing and polymerizing one kind of dibasic acid with three kinds of diols to obtain a random copolymer resin; (b) melting and extruding the random copolymer resin to obtain an unstretched sheet; and (c) stretching the unstretched sheet in the main contraction direction thereof and then thermally fixing the stretched sheet.

In step (b), the melting-extruding temperature of the random copolymer resin may be 260° C. to 285° C.

In step (c), the stretching ratio of the unstretched sheet may be 1:3.5 to 1:4.5, and the thermal fixing temperature of the stretched sheet may be 65° C. to 95° C.

The thickness of the heat-shrinkable polyester film prepared in accordance with the present invention may be 20 μm to 90 μm.

The present invention provides a label for container comprising the heat-shrinkable polyester film of the present invention.

The label for container may be used as a label for a high-density polyethylene (HDPE) container. In this case, since the shrinkage initiation temperature of the heat-shrinkable polyester film is lower than that of a conventional polyester film, the heat-shrinkable polyester film is thermally contracted and labeled on the HDPE container before the HDPE container is fully expanded, and thus the adhesion between the heat-shrinkable polyester film and the HDPE container can be maintained even after the HDPE container is contracted at room temperature.

Hereinafter, the present invention is described more specifically by the following examples, but these are provided only for illustration purposes and the present invention is not limited thereto.

Examples 1 to 3 and Comparative Examples 1 and 2

Preparation of Heat-Shrinkable Polyester Films

Copolymerized polyester resins were prepared according to the composition ratio given in Table 1 below. The prepared copolymerized polyester resins were melted and extruded, stretched in the main contraction direction thereof, and then thermally fixed to manufacture heat-shrinkable polyester films with thickness of 40 μm, respectively. In this process, the polymerization reaction conditions and other process conditions were set in accordance with standard preparation methods for polyester film commonly known and used in the art.

TABLE 1

| Composition ratio (mol %) | | Example 1 | Example 2 | Example 3 | Comparative Example 1 | Comparative Example 2 |
|---|---|---|---|---|---|---|
| Dibasic acid | TPA | 100 | 100 | 100 | 100 | 100 |
| Diols | EG | 80 | 75 | 70 | 80 | 75 |
|  | NPG | 15 | 15 | — | 20 | — |
|  | CHDM | — | — | 20 | — | 25 |
|  | DEG | 5 | — | 10 | — | — |
|  | 1,4-BDO | — | 10 | — | — | — |

TPA: terephthalic acid,
EG: ethylene glycol
NPG: neopentyl glycol,
DEG: diethylene glycol
1,4-BDO: 1,4-butanediol,
CHDM: 1,4-cyclohexanedimethanol The polyester films prepared in Examples 1 to 3 and Comparative Examples 1 and 2 were evaluated using the following test methods, and the results thereof are shown in Table 2 below.

Test Example 1

Heat Shrinkage Rate

Test samples were cut to a size of 300 mm (length)×15 mm (width), and then heat-treated in a water bath maintaining a predetermined temperature for 10 seconds, and then the lengths of the heat-treated test samples were measured. The heat shrinkage rate of each of the test samples was calculated by the following equation:

Heat shrinkage rate (%)=[(300−test sample length after heat treatment (mm))/300]×100

Test Example 2

Evaluation of Defect Rate (Labeling Performance) of HDPE Container

When each of the polyester films prepared in Examples 1 to 3 and Comparative Examples 1 and 2 was labeled on one hundred HDPE containers and then pressure was applied by hand. If the label became loose enough to be folded, the labeled HDPE container was counted as "defective." The number of the defective HDPE containers in one hundred HDPE containers was represented by a percentage. Based on this result, the labeling performance of each of the polyester films was evaluated as follows:
Good: defect rate of less than 5%
Poor: defect rate of 5% or more Test Example 3

Glass Transition Temperature (Tg)

Glass transition temperatures of each of the polyester films were measured using a differential scanning calorimeter (Q100, TA Corporation).

TABLE 2

| Categories | | Example 1 | Example 2 | Example 3 | Comparative Example 1 | Comparative Example 2 |
|---|---|---|---|---|---|---|
| Heat shrinkage rate (%) | 60° C. | 2 | 5 | 5 | 0 | 0 |
|  | 65° C. | 23 | 36 | 30 | 0 | 0 |
|  | 70° C. | 45 | 50 | 48 | 25 | 20 |
|  | 80° C. | 72 | 73 | 73 | 72 | 72 |
|  | 90° C. | 75.5 | 75.5 | 75.5 | 75.5 | 75.5 |
|  | 100° C. | 76.7 | 76.7 | 76.7 | 76.7 | 76.7 |
| Defect rate of container (%) | | 3 | 1 | 1 | 90 | 90 |
| Evaluation of labeling performance | | good | good | good | poor | poor |
| Tg (° C.) | | 75 | 72 | 72 | 79 | 84 |

As shown in Table 2 above, it can be ascertained that each of the heat-shrinkable polyester films of Examples 1 to 3 maintains adhesivity even after it is labeled on a HDPE container because its shrinkage initiation temperature is 60° C. or lower. In contrast, each of the polyester films prepared in accordance with Comparative Examples 1 and 2 becomes loose after it is labeled on the HDPE container due to their high shrinkage initiation temperatures.

While the invention has been described with respect to the above specific embodiments, it should be recognized that various modifications and changes may be made to the invention by those skilled in the art which also fall within the scope of the invention as defined by the appended claims.

What is claimed is:

1. A heat-shrinkable polyester film having a heat shrinkage initiation temperature of 60° C. or lower, a glass transition temperature (Tg) of 77° C. or lower and a heat shrinkage rate of 2% or more at 60° C.,
    wherein the film has a heat shrinkage rate of 15% or more at 65° C., 42% or more at 70° C., and 70% or more at 80° C.;
    wherein the film is prepared by random-copolymerization of one kind of a dibasic acid component with three kinds of diol components;
    wherein the dibasic acid component (A1) is one of terephthalic acid and dimethyl terephthalate; and
    wherein the diol components are (B1) ethylene glycol, (B2) one of neopentyl glycol and cyclohexanedimethanol, and (B3) a linear diol component having three or more carbon atoms at a main chain thereof.

2. The heat-shrinkable polyester film of claim 1, wherein the film has a heat shrinkage initiation temperature in a range of 55° C. to 60° C., a glass transition temperature in a range of 70° C. to 77° C., and a heat shrinkage rate of 2% to 10% at 60° C., 15% to 40% at 65° C., 42% to 60% at 70° C., and 70% to 75% at 80° C.

3. The heat-shrinkable polyester film of claim 1, wherein the diol component (B3) is selected from the group consisting of diethylene glycol, 1,3-propanediol, 1,4-butanediol and 1,5-pentanediol.

4. The heat-shrinkable polyester film of claim 1, wherein the amounts of (B1), (B2), and (B3) of the diol components are 60 to 90 mol %, 5 to 30 mol %, and 1 to 20 mol %, respectively, based on the total amount of (B1), (B2), and (B3).

5. The heat-shrinkable polyester film of claim 1, wherein the amounts of (B1), (B2), and (B3) of the diol compounds are 60 to 85 mol %, 10 to 25 mol %, and 1 to 15 mol %, respectively, based on the total amount of (B1), (B2), and (B3).

6. The heat-shrinkable polyester film of claim 1, wherein the heat-shrinkable polyester film is uniaxially stretched in the main contraction direction thereof.

7. A label for container comprising the heat-shrinkable polyester film of claim 1.

8. The label of claim 7, wherein the label for container is used as a label for a high-density polyethylene container.

* * * * *